US012439855B2

(12) United States Patent
Mösker et al.

(10) Patent No.: US 12,439,855 B2
(45) Date of Patent: Oct. 14, 2025

(54) BALE RETRIEVER FOR TRANSPORTING A BALE, WORK TRAIN COMPRISING A ROUND BALER AND A BALE RETRIEVER, AND METHOD OF DISCHARGING BALES FROM A ROUND BALER OF SUCH WORK TRAIN

(71) Applicant: Maschinenfabrik Bernard Krone GmbH & Co. KG, Spelle (DE)

(72) Inventors: Markus Mösker, Lünne (DE); Michael Kreyenhagen, Böhmte (DE); Nils Bruhn, Spelle (DE); André Berghaus, Billerbeck (DE); Hannes Mählmann-Dunker, Neuenkirchen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 0 days.

(21) Appl. No.: 18/618,832

(22) Filed: Mar. 27, 2024

(65) Prior Publication Data
US 2024/0334875 A1 Oct. 10, 2024

(30) Foreign Application Priority Data
Apr. 5, 2023 (DE) .......................... 102023108773.8

(51) Int. Cl.
*A01D 85/00* (2006.01)
*A01F 15/08* (2006.01)

(52) U.S. Cl.
CPC ........ *A01D 85/005* (2013.01); *A01F 15/0883* (2013.01); *A01D 2085/007* (2013.01); *A01D 2085/008* (2013.01)

(58) Field of Classification Search
CPC ............ A01D 85/005; A01D 2085/007; A01D 87/127; A01D 90/083; A01D 2085/008;
(Continued)

(56) References Cited

U.S. PATENT DOCUMENTS 4,019,643 A * 4/1977 Kampman ................ B60P 1/28
280/472
4,044,967 A * 8/1977 Guichon .............. A01D 87/127
414/436
(Continued)

FOREIGN PATENT DOCUMENTS

DE 3347220 C2 * 7/1987 ........... A01D 90/083
EP 0110056 A2 6/1984
EP 0424192 A1 * 4/1991 ........... A01D 90/083

OTHER PUBLICATIONS

Extended European Search Report in EP24161450.2, mailed Jul. 29, 2024, 9 pages.

*Primary Examiner* — Gregory W Adams
(74) *Attorney, Agent, or Firm* — McKee, Voorhees & Sease, PLC

(57) ABSTRACT

A bale accumulator for attaching to a round baler and for transporting a bale, with a carrying device for carrying the bale, which is adjustable into a loading position to pick up the bale, into a transport position to transport the bale, and into an unloading position to discharge the bale onto the ground, wherein the bale accumulator has two wheels, wherein the carrying device is mounted, as seen in a first spatial direction, at the height of or below a wheel axis of a wheel of the bale accumulator and/or that the carrying device is arranged between the two wheels of the bale accumulator. The present disclosure furthermore relates to a work train comprising a round baler and such a bale accumulator as well as a method for unloading a first and a second bale from a round baler of such a work train onto the ground.

15 Claims, 12 Drawing Sheets

(58) Field of Classification Search
CPC ............ A01D 2087/128; A01D 87/122; A01F 15/0883; B65H 2405/422; B65H 75/425; B60P 1/04; B60P 1/16; B60P 1/165
USPC ........................................ 414/24.5, 24.6, 111
See application file for complete search history.

(56) References Cited

U.S. PATENT DOCUMENTS

| | | | | |
|---|---|---|---|---|
| 4,248,561 A | * | 2/1981 | Graves | A01D 90/083 |
| | | | | 414/491 |
| 4,685,270 A | * | 8/1987 | Brambilla | B65B 11/04 |
| | | | | 53/210 |
| 4,955,774 A | * | 9/1990 | Van Eecke | A01D 90/08 |
| | | | | 414/502 |
| 5,257,885 A | * | 11/1993 | Reil | A01D 87/127 |
| | | | | 414/469 |
| 6,106,209 A | * | 8/2000 | Krenek | B60P 7/12 |
| | | | | 414/24.5 |
| 6,240,712 B1 | * | 6/2001 | Meijer | A01F 15/0883 |
| | | | | 100/88 |
| 8,230,663 B2 | * | 7/2012 | Viaud | A01F 15/071 |
| | | | | 53/118 |
| 9,635,814 B2 | * | 5/2017 | Kraus | A01F 15/0883 |
| 10,034,431 B2 | * | 7/2018 | Monteyne | A01F 15/0765 |
| 2003/0024407 A1 | * | 2/2003 | Ehrenpfort | A01F 15/0883 |
| | | | | 100/8 |
| 2016/0014971 A1 | | 1/2016 | Kraus | |
| 2021/0122419 A1 | * | 4/2021 | Miller | B62D 27/023 |

* cited by examiner

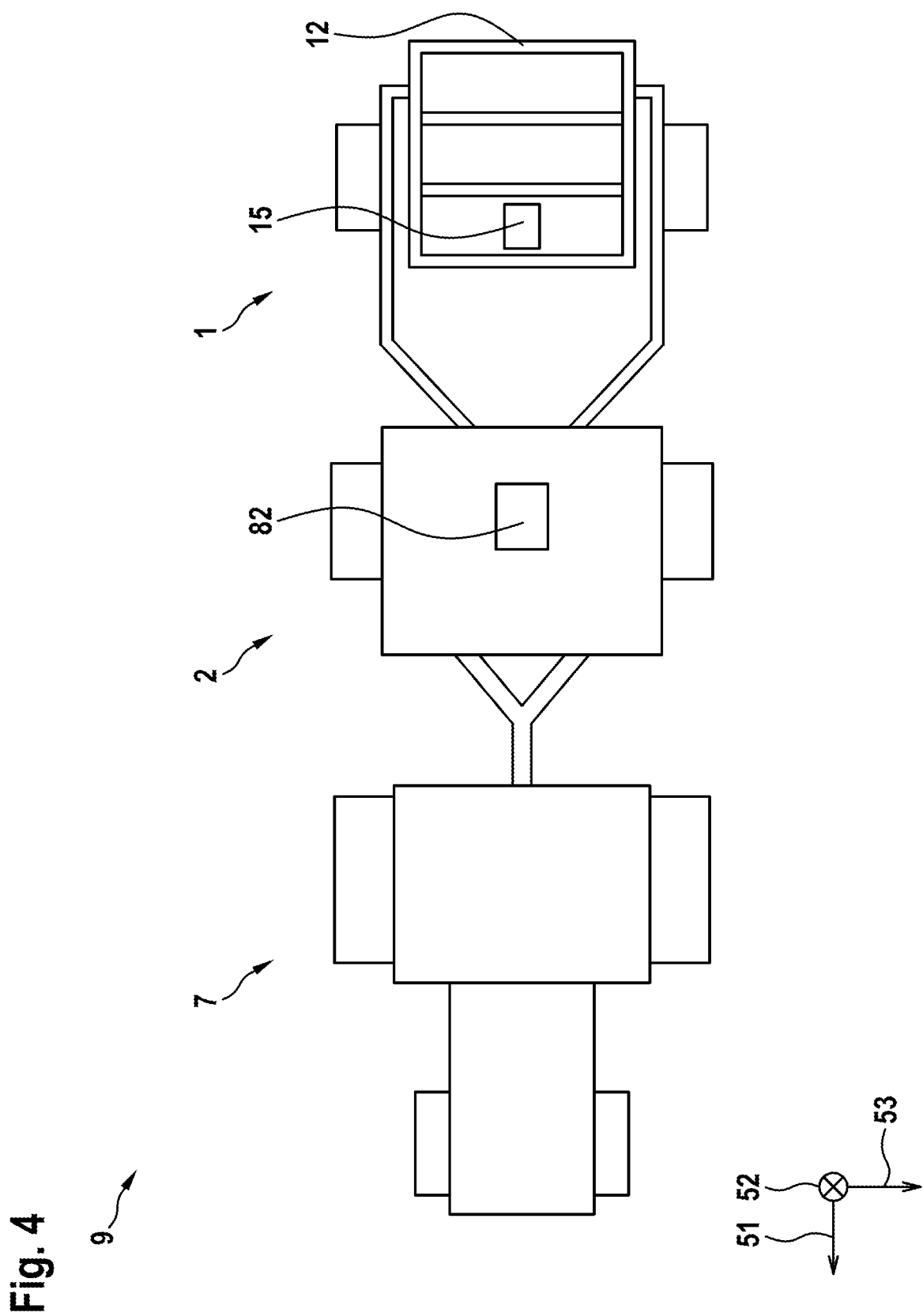

BALE RETRIEVER FOR TRANSPORTING A BALE, WORK TRAIN COMPRISING A ROUND BALER AND A BALE RETRIEVER, AND METHOD OF DISCHARGING BALES FROM A ROUND BALER OF SUCH WORK TRAIN

CROSS REFERENCE TO RELATED APPLICATIONS

This application claims priority under 35 U.S.C. § 119 to German Patent Application DE 10 2023 108 773.8, filed Apr. 5, 2023, which is herein incorporated by reference in its entirety, including without limitation, the specification, claims, and abstract, as well as any figures, tables, appendices, or drawings thereof.

FIELD OF THE INVENTION

The present invention relates to a bale accumulator for attaching to a round baler and for transporting a bale, with a carrying device for carrying the bale, which is adjustable into a loading position to pick up the bale, into a transport position to transport the bale, and into an unloading position to discharge the bale onto the ground, wherein the bale accumulator has two wheels. The present invention furthermore relates to a work train comprising a round baler and such a bale accumulator as well as a method for unloading a first and a second bale from a round baler of such a work train onto the ground.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

In agriculture, crops such as, for example, hay and straw are often placed in swaths on the surface of the ground in order to subsequently bale it into compact bales. For example, round balers, which pick up the crops placed in the swaths and process them into bales, are used for the purpose of baling.

The distance between consecutive depositing locations of the bales is determined by the amount of crop picked up, which is required on average for a bale of a defined size. Since the lanes in a field, as a result of their dimensions, do not generally correspond to a distance between consecutive depositing locations, and the swath size can also vary, the bales are deposited and distributed over the entire field. The effort involved in collecting the bales on a transport vehicle is therefore high both in terms of the time required and the power required and/or the energy consumption.

It is known from the prior art to attach a bale accumulator to a round baler, with which bale accumulator at least one or more bales can be transported jointly to a depositing location in order to be deposited a short time after one another and spatially close to one another. As a result of this, the bales are placed in a less distributed manner on the field and can be collected more effectively, i.e., quicker, wherein the energy consumption is also reduced due to the reduced distance traveled.

The publication EP 3 298 882 B1 discloses, for example, a round baler with a winding device attached to it. In order to reduce the outlay for collecting the bales, the publication proposes carrying a first baled bale on the winding device until a subsequent second bale is almost completely baled in order to be able to deposit the two bales close to one another in terms of time so that they are deposited spatially close to one another on the ground, wherein the round baler continuously travels forward. The winding device is used in this case to transport the first bale.

Bale accumulators known from the prior art have a carrying device, which is provided to transport at least one bale. The bales are conveyed from the ejection opening of the baler via a conveying surface, for example, by means of an active conveying device or a ramp, to the carrying device of the bale accumulator. So that the ejected bale does not hinder the closing of the tailgate of the baler, such bale collectors often have a comparatively long design. As a result of this, the closing of the tailgate of the round baler can only be performed with a time delay so that the bale does not obstruct the tailgate. An active conveying of the bale to the carrying device furthermore requires a power by which the fuel consumption of the drive machine is increased.

Thus, there exists a need in the art for a bale accumulator for attaching to a round baler and for transporting a bale, with a carrying device for carrying the bale which is adjustable into a loading position to pick up the bale, into a transport position to transport the bale, and into an unloading position to discharge the bale onto the ground.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The object of the present invention is to create a bale accumulator which enables very rapid depositing of bales without obstructing the working processes of the round baler during the depositing of bales, and wherein the bale accumulator furthermore enables further optimized bale depositing so that the bales can be gathered in more efficiently.

The object is achieved with a bale accumulator with the features of bale accumulator (1) for attaching to a round baler (2) and for transporting a bale (6), with a carrying device (12) for carrying the bale (6) which is adjustable into a loading position (L) to pick up the bale (6), into a transport position (T) to transport the bale (6), and into an unloading position (A) to discharge the bale (6) onto the ground (4), wherein the bale accumulator (1) has two wheels (16), where the carrying device (12) is mounted, as seen in a first spatial direction (52), at the height of or below a wheel axis (163) of a wheel (16) of the bale accumulator (1) and/or that the carrying device (12) is arranged between the two wheels (16) of the bale accumulator (1).

The object of the present disclosure also includes a work train that includes a round baler (2) and a bale accumulator (1).

Moreover, an object of the present disclosure also includes a method for unloading a first and a second bale (6, I; 6, II) from a round baler (2) of a work train as claimed in claim 13 onto the ground (4), wherein the round baler (2) includes a baling chamber (20) for baling bales (6, I; 6, II), wherein the bale accumulator (1) is attached to the round baler (2), and a carrying device (12) which is provided to carry the first bale (6, I) during the formation of the second bale (6, II), wherein the bales (6, I; 6, II) are deposited at the same unloading position by the round baler (2), and wherein the second bale (6, II) is pushed against the first bale (6, I) during unloading.

A bale accumulator is created for this. The bale accumulator is provided for attaching to a round baler and to transport a bale. The bale is baled from crops, for example, from straw or hay.

The bale accumulator has a carrying device for carrying the bale which is adjustable into a loading position to pick up the bale, into a transport position to transport the bale, and into an unloading position to discharge the bale onto the ground.

The bale accumulator furthermore has two wheels. The bale accumulator is guided over the ground with the wheels and is supported by them.

The bale accumulator is characterized in that the carrying device is mounted, as seen in a first spatial direction, at the height of or below a wheel axis of a wheel of the bale accumulator and/or that the carrying device is arranged between the two wheels of the bale accumulator. The first spatial direction on flat ground is preferably the vertical direction.

Since the carrying device is arranged between the two wheels of the bale accumulator and/or the mounting of the carrying device of the bale accumulator is arranged in the first spatial direction at the height of or below the wheel axis, a distance between the carrying device of the mounting of the carrying device and the ground is small. A bale picked up into the carrying device is arranged between the wheels as a result of this. It preferably extends at least partially at the height of or even below the wheel axis. As a result of this advantageously low position of the carrying device, the tailgate can be closed in the case of a bale picked up into the carrying device, in particular also in the case of a comparatively small distance from the carrying device to the round baler, without colliding with the bale. The bale collector can have a compact design as a result of this.

Moreover, the bale only has to be raised or lowered via a small distance to the ground when adjusting the carrying device from the loading position into the transport position and/or from the transport position into the unloading position. Only a small amount of power is required as a result of the short paths required for this. As a result of this, the bale can be loaded and unloaded very quickly.

The carrying device preferably comprises retaining struts which provide the carrying device with stability. The retaining struts particularly preferably have a hollow profile. Such retaining struts with a hollow profile are conventional manufacturing components and can, therefore, be procured at low-cost. Moreover, as a result of their hollow profile, they are very light, hence the bale accumulator has a low weight. As a result of this, only a small amount of fuel is required to pull the bale accumulator. Alternatively, or additionally, the carrying device can have an at least in regions closed, continuous, and/or solid carrying surface, for example, composed of a metal sheet.

In order to laterally guide the bale, the carrying device can furthermore have lateral retaining struts. The lateral retaining struts delimit a receiving space of the carrying device for the bale.

The two wheels of the bale accumulator are preferably suspended individually on a frame of the bale accumulator. In a second spatial direction, which extends transverse to the first spatial direction, the wheels are preferably arranged to the side of the carrying device. The individual wheel suspension has the advantage that the bale accumulator does not have a continuous wheel axis. Instead, the wheels are preferably fastened to bolts. An imaginary connection of the bolts forms a notional wheel axis around which the wheels are rotatable. As a result of the individual wheel suspension, enough space is present between the wheels for the arrangement of the carrying device so that these can be mounted at the height or even below the wheel axis. The lateral retaining struts delimit the receiving space of the carrying device for the bale so that it cannot obstruct the wheels.

The frame of the bale accumulator is preferably formed to be substantially U-shaped. It furthermore preferably has two outer beams which are connected to one another by a cross beam. In one preferred embodiment, the outer beams extend approximately at a right angle to the cross beam. In principle, however, they can also extend at an obtuse angle to the cross beam, for example, at an angle greater than 900 and smaller than 150°. The outer beams preferably have, at least in regions, an extension component in the depositing direction, wherein the cross beam extends in the second spatial direction, in particular below the carrying device. In order to fasten the wheels to the frame, it is furthermore preferred that in each case, one projecting retaining arm is provided on the frame for each wheel, on which retaining arm the wheel assigned to it is suspended.

In each case, a wheel bearing is preferably arranged at an open end of each of the holding arms, in which wheel bearing the wheel suspension of the wheel assigned to it is suspended rotatably about a chassis axis. The chassis axis extends in the first spatial direction in this case. As a result of this, the wheels are rotatable in each case relative to the retaining arm assigned to it.

The carrying device is rotatably or pivotably mounted on at least one rotary bearing, preferably a rubber bearing, a ball joint bearing or a rolling bearing, about a retaining axis in and counter to a pivoting direction. As a result of this, the carrying device is rotatable and pivotable from the loading position into the transport position, and back again from the transport position into the unloading position. The rotary bearing is preferably fastened, particularly preferably welded-on, to a retaining strut of the carrying device. In an alternative embodiment, a rotation or pivoting of the carrying device can also be realized via a connecting link.

In one preferred embodiment, the rotary bearing is fastened to the cross beam via the corresponding bolts so that the carrying device, as seen in the first spatial direction, is arranged above the cross beam. As a result of this, the cross beam is arranged below the retaining axis. It absorbs the loads caused by the bale. The carrying device is particularly preferably rotatably or pivotably mounted on two rotary bearings spaced apart from one another. As a result of this, the load can be better distributed, in particular symmetrically.

In the transport position, the carrying device is preferably arranged above the cross beam. By rotating or pivoting the carrying device in the pivoting direction, in the loading position, it is rotatable or pivotable toward a side facing the round baler, and by rotating or pivoting counter to the pivoting direction, in the unloading position, it is rotatable or pivotable toward a side facing away from the round baler.

In one preferred embodiment, the bale accumulator comprises at least one actuator with which the carrying device is rotatable or pivotable. The actuator is preferably formed as a hydraulic, pneumatic, electric, or electrohydraulic actuator. It is advantageously formed as a single-acting hydraulic cylinder, which is provided to adjust the carrying device from the unloading position into the transport position and/or from the transport position into the loading position. The bale accumulator of this embodiment preferably has a return means, for example, a spring, for returning the carrying device, from the loading position into the transport position and from the transport position into the unloading position.

Alternatively, however, a double-acting cylinder can also be used, which is provided both for the adjustment of the carrying device from the loading position into the transport position and from the transport position into the unloading position, and from the unloading position into the transport position and from the transport position back into the loading position. In this embodiment, no return means is required to return the carrying device.

The bale accumulator preferably has a sensor, which is configured to detect whether the bale is arranged in the carrying device. As a result of this, undefined operating states are avoided, which can arise if the bale has not yet been completely ejected, for example, after a predefined ejection time has expired.

The bale accumulator preferably has a tow bar, which comprises external drawbars. As a result of this, the bale can be placed between the drawbars and is guided laterally by the drawbars during loading into the carrying device. As a result of this arrangement, the bale cannot escape laterally from the round baler during depositing.

The tow bar preferably has a central ball joint and/or at least one lateral tension and/or compression strut for articulation of the bale accumulator to the round baler. The ball joint is preferably arranged, in particular centrally, on a crossbar, which connects the external drawbars, of the tow bar. It is preferably fastenable or fastened to an elongated hole of the round baler, for example, by means of a bolt. As a result of this, twisting of the tow bar, for example, when traveling over uneven ground, can be prevented. In order to ensure that the bale collector follows the round baler in its lane, the at least one tension and/or compression strut can be fastened, in particular to the frame of the round baler, further particularly laterally. Two tension and/or compression struts are advantageously provided on the tow bar which can be linked to these in each case on opposite sides of the frame of the round baler, in particular symmetrically. When two tension and/or compression struts arranged symmetrically are used, the bale collector is compelled to travel flush behind the round baler. In principle, the bale collector can, however, also only be articulated to the round baler via the ball joint, or alternatively via a spherical head.

The object is furthermore achieved with a work train comprising around baler and such a bale accumulator. The round baler can be formed as a self-driving round baler and configured to drive the bale accumulator. An embodiment is, however, also preferred in the case of which the work train comprises a tractor. In this embodiment, the round baler is articulated to the tractor. It is preferably driven from the tractor, in particular by means of a PTO shaft and power couplings. A drive of the bale accumulator can, in principle, be performed both from the tractor and from the round baler.

The object is furthermore achieved with a method for unloading a first and a second bale from a round baler of such a work train to the ground, wherein the round baler comprises a baling chamber for baling bales, in particular of a first bale and a second bale baled after this, wherein the bale accumulator is attached to the round baler, and a carrying device which is provided to carry the first bale during the formation of the second bale, wherein the bales are deposited at the same unloading position by the round baler, and wherein the second bale is pushed against the first bale during unloading.

Since the bales rub against one another during depositing, they hook into one another. As a result of this, the bales still bear against one another even if the work train continues its journey. Since the bales bear directly against one another, they can be picked up by a commercially available pick-up fork by a tractor in the same operation and placed onto a transport vehicle.

Since, in this case, two bales are placed directly next to one another at all times, the bales are only distributed at half as many depositing locations on the field. The bales can be gathered in correspondingly faster. The route traveled during collection is significantly reduced as a result of this, hence, both fuel consumption and the time required for the harvesting process is significantly reduced overall.

In one preferred embodiment, the carrying device is pivotable, starting from a transport position by pivoting in a pivoting direction reversibly into a loading position, and starting from the transport position by pivoting counter to the pivoting direction reversibly into an unloading position, wherein the method comprises the consecutive steps:

Carrying the first bale in the carrying device, wherein the carrying device is in the transport position, while the round baler forms a subsequent second bale;
Starting a binding of the second bale;
Depositing the first bale on the ground by pivoting the carrying device from the transport position into the unloading position;
Pivoting the carrying device from the unloading position into the loading position;
Ejecting the second bale from the round baler;
Picking up the second bale into the carrying device;
Depositing the second bale on the ground by pivoting the carrying device from the loading position into the unloading position; and
Pivoting the carrying device from the unloading position into the transport position, wherein the second bale is pushed against the first bale during the pivoting of the carrying device from the unloading position into the transport position.

The second bale tends to roll into the same position into which the first bale is deposited when being deposited from the carrying device. In this case, it rolls against the first bale. During pivoting back of the carrying device, the last (fourth) retaining strut in the direction of travel is pushed against the second bale, and this, as a result, is pushed against the first bale. As a result of this, the bales generally bear directly against one another.

The round baler stops during the binding of the second bale, preferably until the second bale is deposited and the carrying device is pivoted back into the transport position. In order to deposit the second bale, the carrying device is adjusted from the loading position directly into the unloading position, in particular, without remaining in the transport position. The bale accumulator furthermore comprises a sensor which detects the presence of the bale in the carrying device. As a result of this, the method can be performed very quickly. The working process only has to be interrupted for a very short time despite the standstill of the round baler.

The round baler preferably comprises a control unit, which indicates to the tractor and/or the bale accumulator that the binding of one of the bales has started. The signal is used to pivot the carrying device from the transport position into the loading position. Since the start of the binding process is indicated to the tractor to ensure that it stops the work train so that no further crop is conveyed into the round baler, the bale accumulator can be operated without changes to the round baler.

After a depositing of the second bale, during forward travel of the round baler, a subsequent first bale is formed, which is provided for depositing with a subsequent second bale at a subsequent depositing position. After baling and binding of this subsequent first bale and it being picked up into the carrying device, the method is repeated.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

The invention is described below on the basis of the figures. The figures are only exemplary and do not restrict the general concept of the invention. In the figures:

FIG. 4 schematically shows a work train comprising a tractor, a round baler, and a bale accumulator.

Figure 1A:
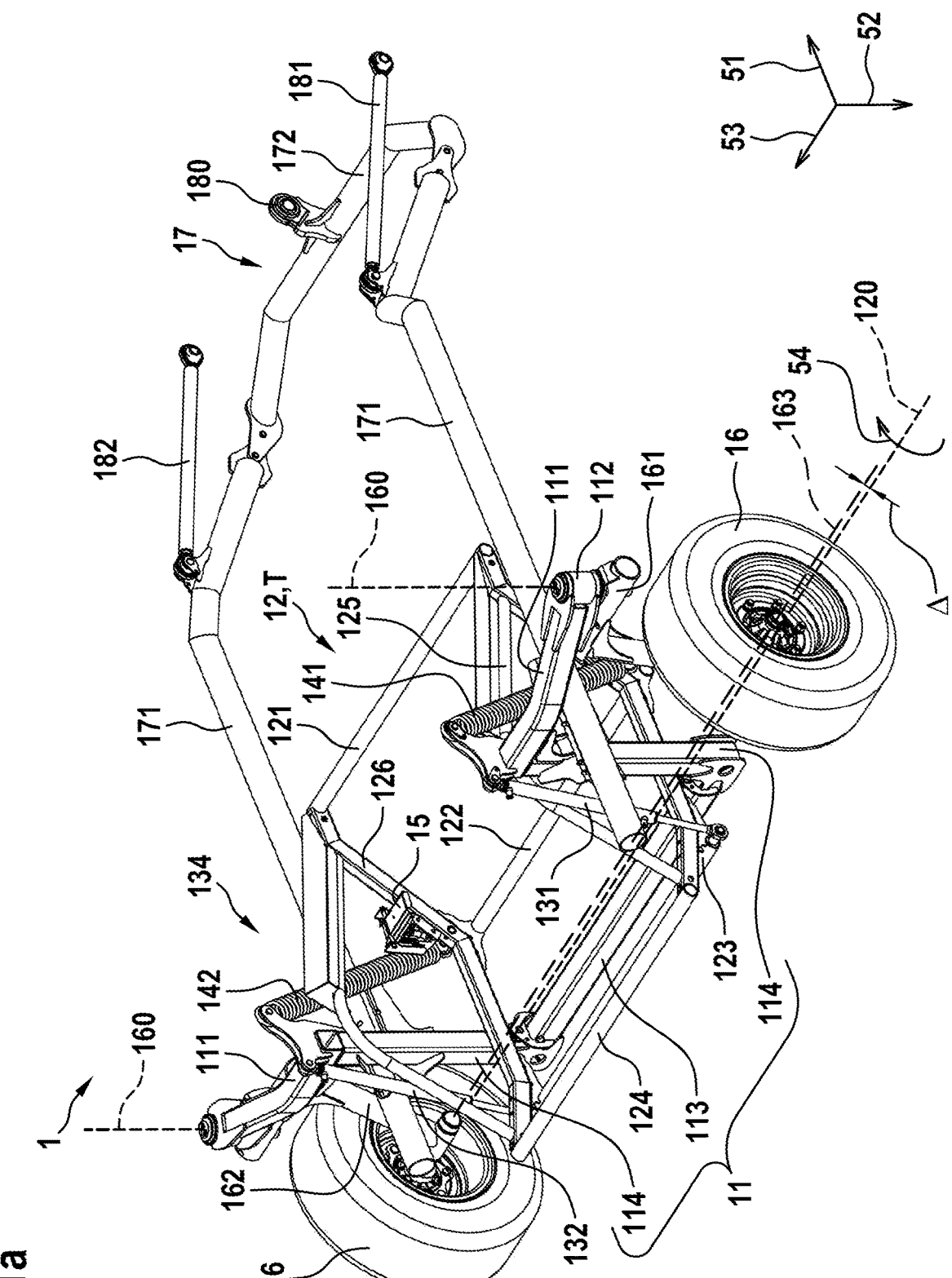
FIGS. 1 (a)-(c) shows the bale accumulator of FIG. 1 in each case in a perspective view, and (d) the bale accumulator attached to the round baler of FIG. 1 (a)-(c) in a further perspective view.
Figure 1B:
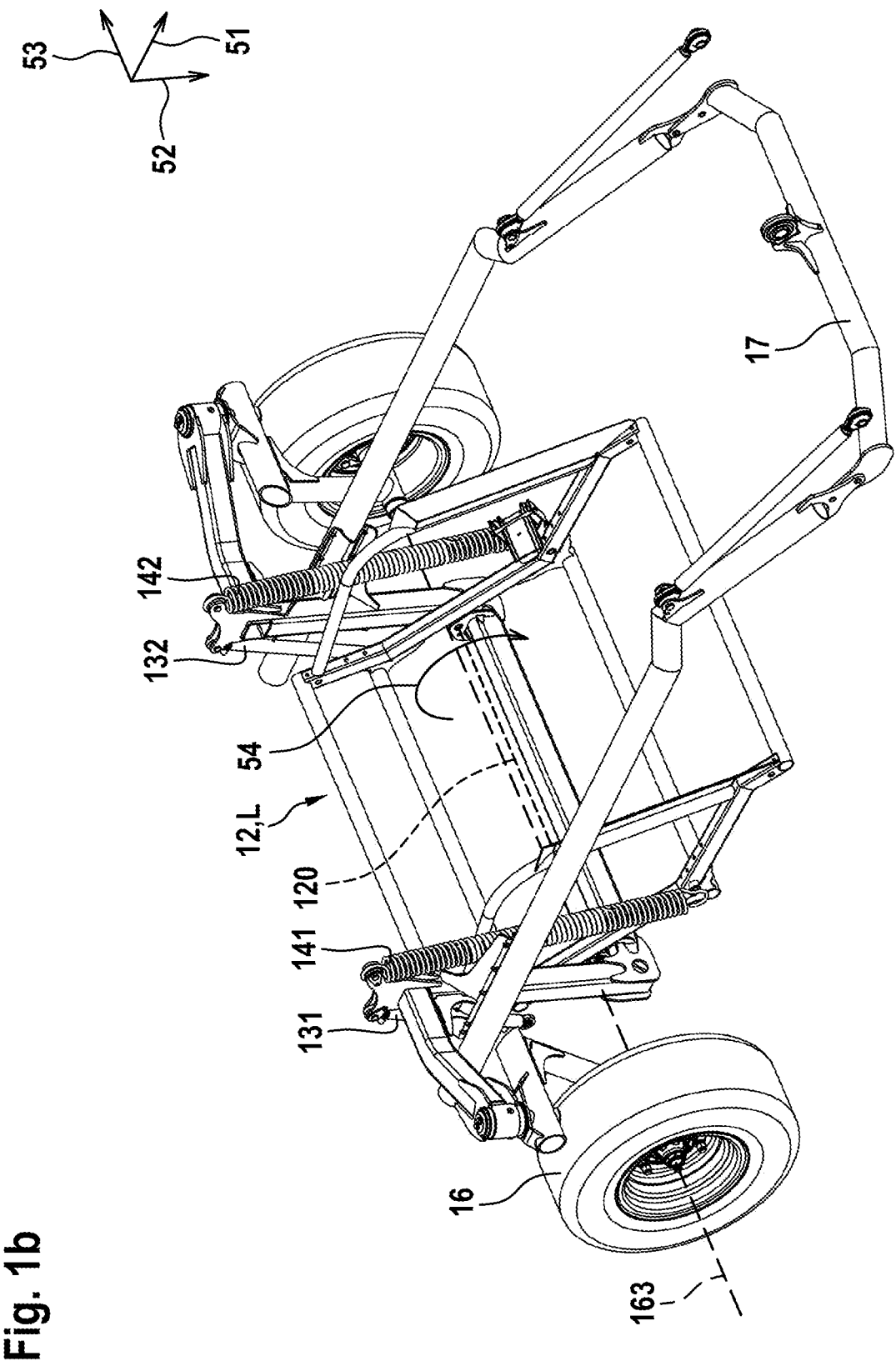
Figure 1C:
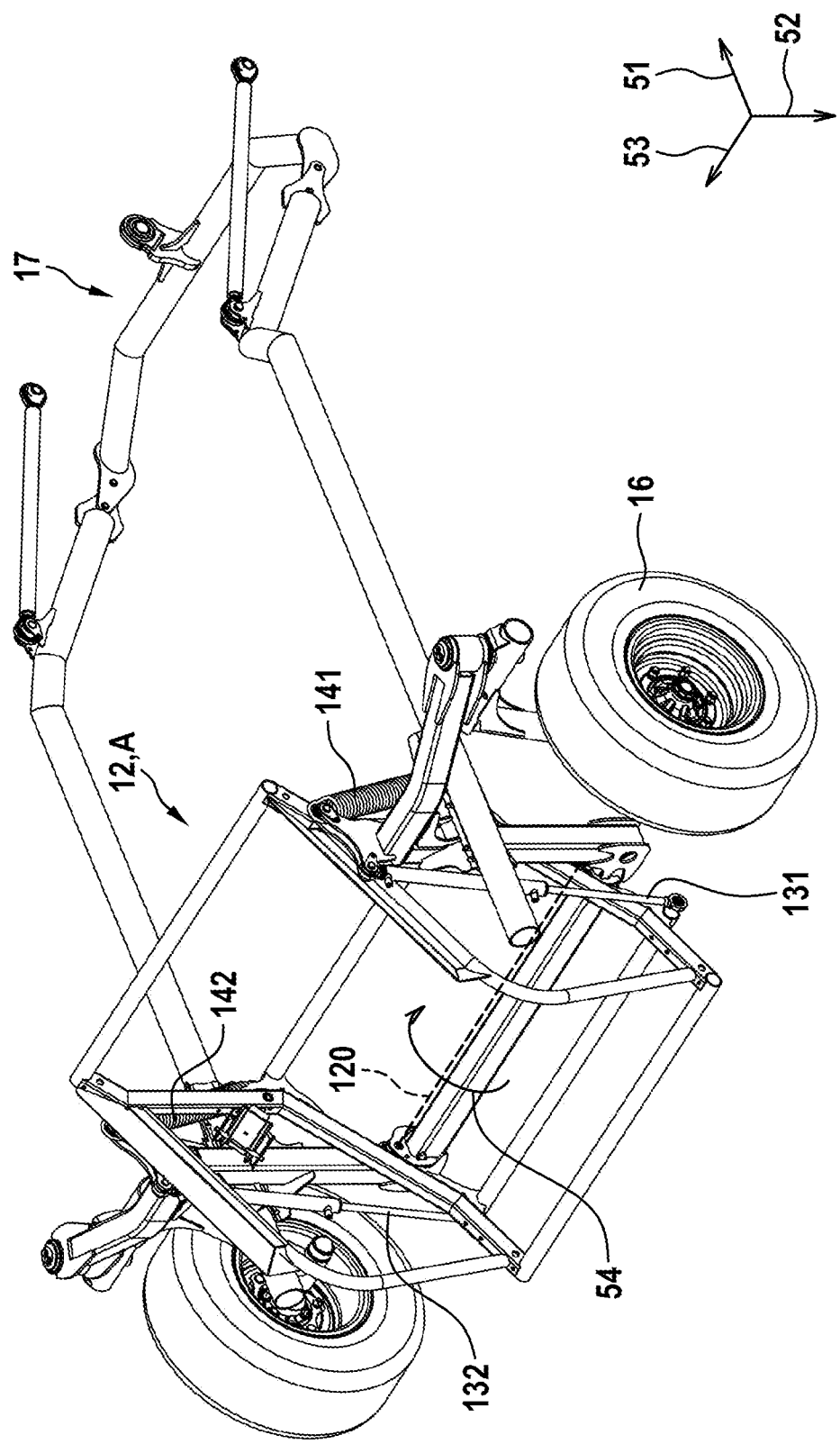
Figure 1D:
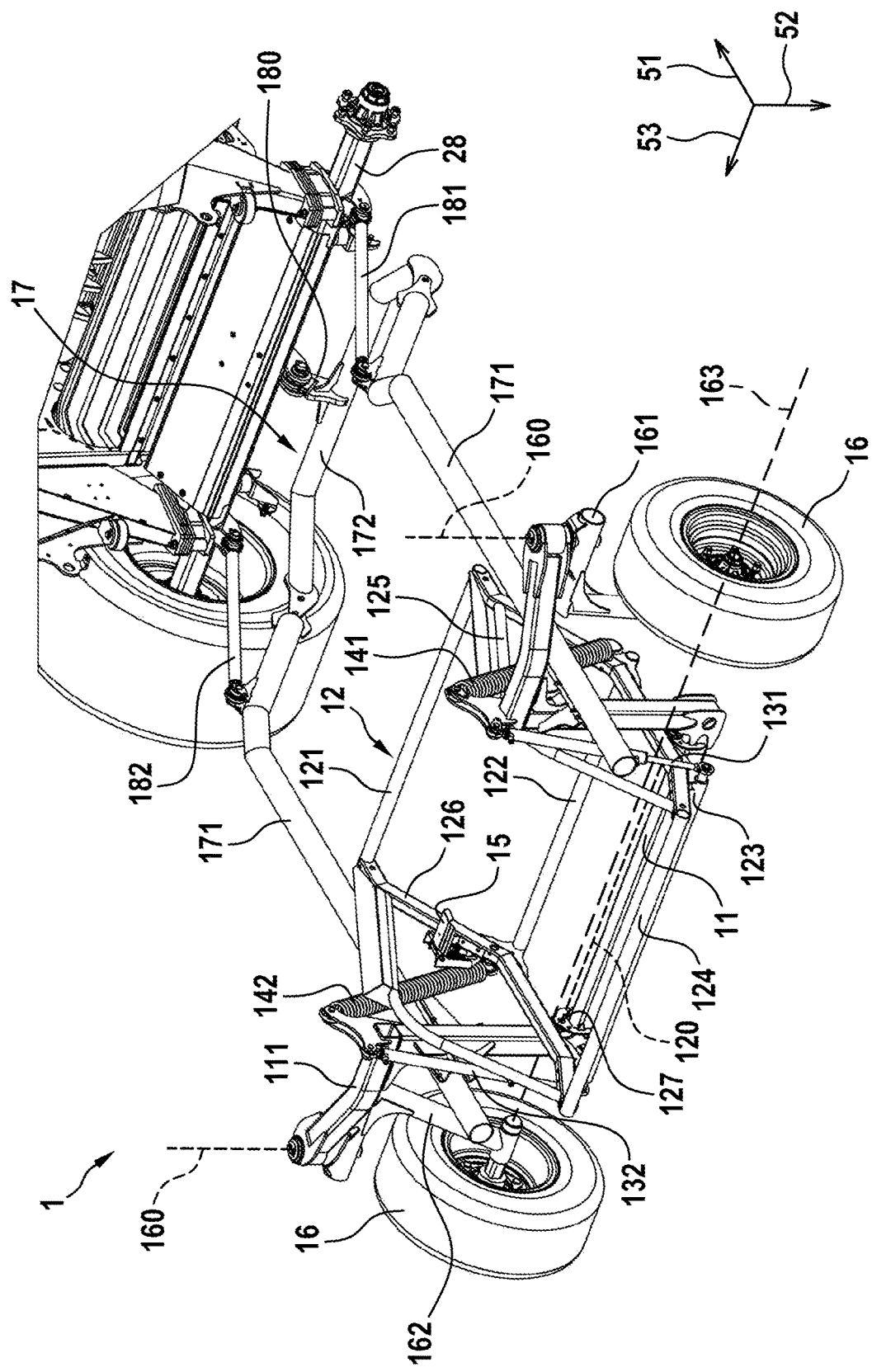

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Referring now to the figures, FIG. 1 shows in (a)-(c) the bale accumulator 1 of FIG. 1 in each case in a perspective view, and (d) the bale accumulator 1 of FIGS. 1 (a)-(c) attached to the round baler 2 in a further perspective view. The bale accumulator 1 is described in greater detail below. The round baler 2 is explained in the context of FIG. 3.

The bale accumulator 1 is provided to transport a bale 6. It has here a carrying device 12, a frame 11, wheels 16, comprising individual wheel suspensions 161, 162, as well as actuators 131, 132, return means 141, 142, and a tow bar 17.

In order to pick up the bale 6 into the bale accumulator 1, the carrying device 12 can be pivoted starting from a transport position T by pivoting in a pivoting direction 54 into a loading position L, for transport of the bail 6 can be pivoted back into a transport position T by pivoting counter to the pivoting direction 54, and for depositing the bale 6 on the ground 4 is pivotable starting from the transport position T by pivoting counter to the pivoting direction 54 into an unloading position. By pivoting in the pivoting direction 54, it can be pivoted back starting from the unloading position A into the transport position T.

The carrying device 12 is produced from a framework of several retaining struts 121-126, here by way of example, six retaining struts 121-126. The carrying device 12 can, however, also have more or fewer retaining struts 121-126. In the case of the bale accumulator 1 represented here, four of the retaining struts 121-126 are arranged transverse to the direction of travel 51. They are provided to carry the bale 6 and, for this purpose, retain it not only in a first spatial direction 52 vertical on flat terrain. Rather, as seen in the first spatial direction 52, the inner of the four retaining struts 121-124 are arranged lower than the outer of the four retaining struts 121-124. As a result of this, during transport, these retaining struts 121-124 ensure secure retention of the bale 6 in and counter to the direction of travel 51. The four retaining struts 121-124 arranged transverse to the direction of travel 51 are connected to one another at their opposite ends (not designated) in each case by a lower retaining strut 126. An upper, arcuate, here almost L-shaped retaining strut 125 is furthermore fastened to the lower retaining strut 126. Both the lower lateral retaining strut 126 and the upper lateral retaining strut 125 provide the carrying device 12 with the necessary stability and guide the bales 6 laterally during loading and during depositing. As a result of this, they prevent a lateral escape of the bale 6 from the carrying device 12 and resultant damage to the bale accumulator 1.

The retaining struts 121-126 have a hollow profile here. As a result of this, the carrying device 12 has a low weight. The low weight has a positive effect on fuel consumption during the towing of the bale accumulator 1. As a result of this, the pressure exerted by the bale accumulator on the ground is also low. Moreover, at least the retaining struts 121-124 arranged transverse to the direction of travel 51 are manufactured from round profiles. As a result of this, they have no edges on which the bale 6 can chafe. In other embodiments (not shown), the retaining struts 121-126 can also have other profiles or even be manufactured from solid material.

The carrying device 12 furthermore comprises a sensor 15 for detecting the bale 6 arranged in the carrying device 12. The sensor 15 is fastened here to the lower retaining strut 126. It is formed as a proximity sensor. It can, however, also be formed as a pressure sensor, light sensor, or ultrasound sensor. The sensor 15 can furthermore also be fastened to other components, in particular, other retaining struts 121-126, of the bale accumulator 1. Further sensors (not represented) can furthermore be provided, for example, to detect the position L, T, A of the carrying device 12 or whether the bale 6 was deposited. The further sensors can enable pick-up of the bale 6 and/or depositing of the bale 6 in an accelerated manner.

The actuators 131, 132 and return means 141, 142 are provided to pivot the carrying device 12. For this purpose, links 128, 129 for the actuators 131, 132 and the return means 141, 142 are arranged on the carrying device 12, to which links 128, 129 these are linked at one end. At the other end, the actuators 131, 132, and return means 141, 142 are fastened to the frame 11 of the bale accumulator 1.

In each case a rotary bearing 127 is furthermore fastened, in particular welded-on, to the lower retaining struts 123. In the represented embodiment, ball joint bearings, which are commonplace in engineering, are used. Alternatively, however, other conventional bearings, such as, for example, rolling bearings or rubber bearings, are used. The rotary bearings 127 are provided for pivotable mounting of the carrying device 12 on the frame 11 of the bale collector 1.

The frame 11 of the bale collector 1 is formed to be approximately U-shaped. It comprises two external outer beams 114, which extend in the first spatial direction 52 and are connected at one end, in particular at a right angle, to a cross beam 113, which extends in the second spatial direction 53. In each case, a bolt (not designated) which corresponds to the rotary bearings 127 of the carrying device 12 is welded-on on the outer beams 114 close to the cross beam 113. In the mounted state, in each case, one of the rotary bearings 127 is arranged rotatably on one of the bolts. The bolts thus form a notional retaining axis 120 oriented in the second spatial direction 53, around which the carrying device 12 is pivotable in and counter to the pivoting direction 54.

The bale accumulator 1 has two wheels 16. The wheels 16 are suspended via wheel suspensions 161, 162 individually and in the second spatial direction 53 laterally of the carrying device 12. For this purpose, the frame 11 has retaining arms 111, which extend protruding in or counter to the second spatial direction 53. As a result, in each case, one wheel suspension 161, 162 is arranged laterally of the carrying device 12. The wheels 16 are rotatable in each case about the chassis axes 160 of the wheel bearings 112 by wheel bearings 112 arranged at the open end of the retaining arms 111, on which wheel bearings 112 the wheel suspensions 161, 162 are mounted. As a result of the individual wheel suspensions 161, 162 of the wheels 16 of the bale accumulator 1, the bale accumulator 1 has no continuous wheel axis 163. The wheels 16 are instead fastened to wheel bolts (not designated). In the case of wheels 16, oriented approximately in the direction of travel 51, the wheel bolts form a notional wheel axis 163 oriented in the second spatial direction 53, around which the wheels 16 are rotatable. As a result of this arrangement, enough installation space is present between the wheels 16 for the arrangement of the carrying device 12.

For pivoting of the carrying device 12, the bale accumulator 1 has actuators 131, 132. These are formed here as hydraulic actuators. However, other actuators 131, 132 from the engineering sector can also be used, such as, for example, pneumatic actuators, or electric actuators such as linear motors or spindle drives. Alternatively, actuators of various types can also be combined. The actuators 131, 132 bring about the pivoting of the carrying device from the unloading position A into the transport position T and from the transport position T into the loading position L.

The carrying device 12 furthermore has return means 141, 142. These are formed, for example, as springs and bring about the return of the carrying device into the transport position T or the unloading position A. As an alternative to springs as return means, for example, gas cylinders can also be used (not shown).

In a further embodiment (not shown), an interaction of the actuators 131, 132 with the return means 141, 142 can be dispensed with by virtue of the fact that the single-acting actuators 131, 132 are replaced by double-acting actuators (not shown) and the dual-acting actuators also take on the function of the return means 141, 142.

The actuators 131, 132 and return means 141, 142 are fastened in each case to the end (not designated), opposite the cross beam 113, of the outer beams 114.

The bale collector furthermore has a tow bar 17, which comprises two external drawbars 171 which are arranged laterally on the frame 11, extend at least in regions in the direction of travel 51, and are connected via a cross bar 172, which extends at least in regions in the second spatial direction 53. The arrangement of the external drawbars 171 ensures a lateral guidance of the bale 6 during ejection of the bale 6 from the round baler 2 and during loading of the bale 6 into the carrying device 12. As a result of this, the bale 6 cannot escape laterally.

The cross beam 113 of the frame 11 of the bale accumulator 1 is, as seen in the first spatial direction, arranged below the retaining axis 120 and the wheel axis 163. It therefore only has a small distance to the ground 4. The retaining axis 120 around which the carrying device 12 is pivotable, is furthermore arranged as close as possible to the cross beam 113. As a result of this, the carrying device 12, as seen in the first spatial direction 52, is mounted below the wheel axis 163 of the bale accumulator 1. This is represented in FIG. 1 (*a*) schematically by a distance A between the retaining axis 120 and the wheel axis 163.

As a result of this deep arrangement, a tailgate 21 of the bale accumulator 2 can already be closed during the pick-up of the bale 6 into the bale accumulator 1 without colliding with the bale 6. The bale accumulator 1 can simultaneously have a very compact design as a result of this so that a distance (not designated) between the carrying device 12 and the round baler 2 is only small. Moreover, the bale 6 only has to be raised or lowered via a small distance to the field surface 4 when adjusting the carrying device 12 from the loading position L into the transport position T and/or from the transport position T into the unloading position A. Only a small amount of power is required as a result of the short paths required for this. This arrangement furthermore enables very quick loading and unloading of the bale 6.

FIG. 1 (*a*) shows the carrying device 12 of the bale accumulator 1 in the transport position T. In the transport position T, piston rods of the actuators 131, 132 are only expanded halfway. As a result of this, the return means 141, 142 are slightly tensioned.

FIG. 1 (*b*) shows the carrying device 12 in the loading position L. In the loading position L, the carrying device 12 is pivoted in pivoting direction 54. As a result of this, the first retaining strut 121 of the carrying device 12 is deposited on the ground 4 on a side (not designated) of the bale accumulator 1 facing away from the round baler 2, or at least arranged close to the ground 4 so that the bale 6 ejected by the round baler 2 can roll into the carrying device 12. The pivoting of the carrying device 12 into the loading position L is performed via the retraction of the piston rods of the actuators 131, 132, wherein the return means 141, 142 are further tensioned, i.e., further expanded.

FIG. 1 (*c*) shows the carrying device 12 in the unloading position A. In the unloading position A, the carrying device 12 is pivoted with respect to the transport direction counter to the pivoting direction 54. As a result of this, the fourth retaining strut 124 of the carrying device 12 is deposited on the ground 4 on a side (not designated) of the bale accumulator 1 facing away from the round baler 2, or at least arranged close to the ground 4 so that the bale 6 can roll out of the carrying device 12 during ejection. The pivoting of the carrying device 12 into the unloading position A is performed via the extension of the piston rods of the actuators 131, 132, wherein the return means 141, 142 are relieved of tension. The forces for expanding the piston rods of the actuators are made available via the return means 141, 142.

FIG. 1 (*d*) shows the bale accumulator 1 attached to the round baler 2. The tow bar 17 has, for articulation of the bale accumulator 1 to the round baler 2, a ball joint 180 fastened centrally to the cross bar 172 as well as at least one, here by way of example two, tension and/or compression struts 181, 182 fastened to the drawbars 171. The tow bar 17 can be attached to the round baler 2 with the ball joint 180. The tension and/or compression struts 181, 182 are fastened laterally to the baling frame 28 of the round baler 2.

The centrally arranged ball joint 180 is fastened by means of a fastening bolt (not shown) to an elongated hole (not shown) on the baling frame 28 of the round baler 2. This arrangement enables a rocking of the bale accumulator 1 relative to the round baler 2. The fastening prevents twisting of the tow bar 17, for example, when driving over uneven ground.

In this embodiment, two tension and compression struts 181, 182 are fastened to the two opposite sides of the baling frame 28 of the round baler 2 symmetrically with the aid of bolts. As a result of this, the bale accumulator 2 and the round baler 2 are oriented flush behind one another.

Figure 2:
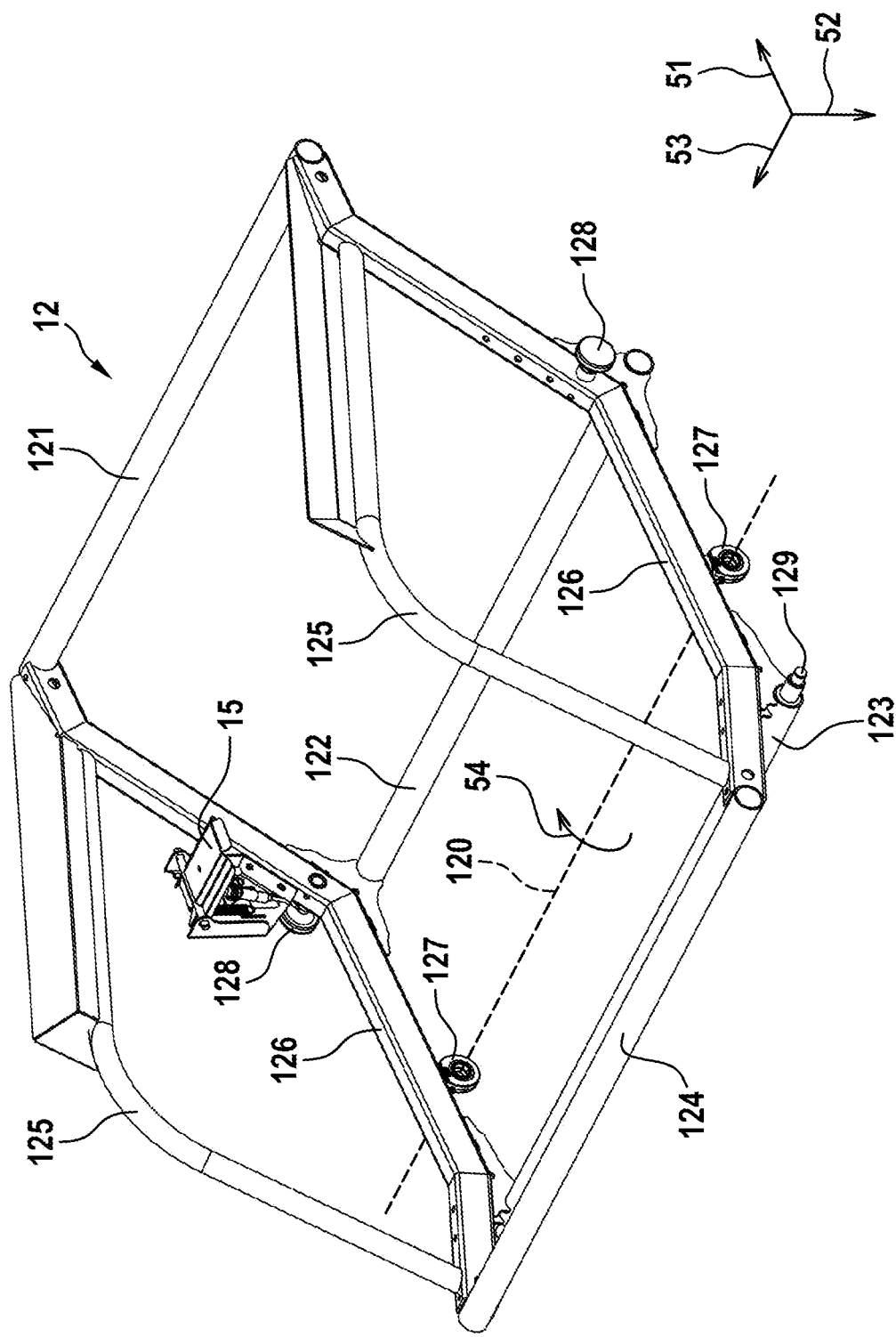
FIG. 2 shows a perspective view of the carrying device in FIGS. 1 and 3.
Figure 3A:
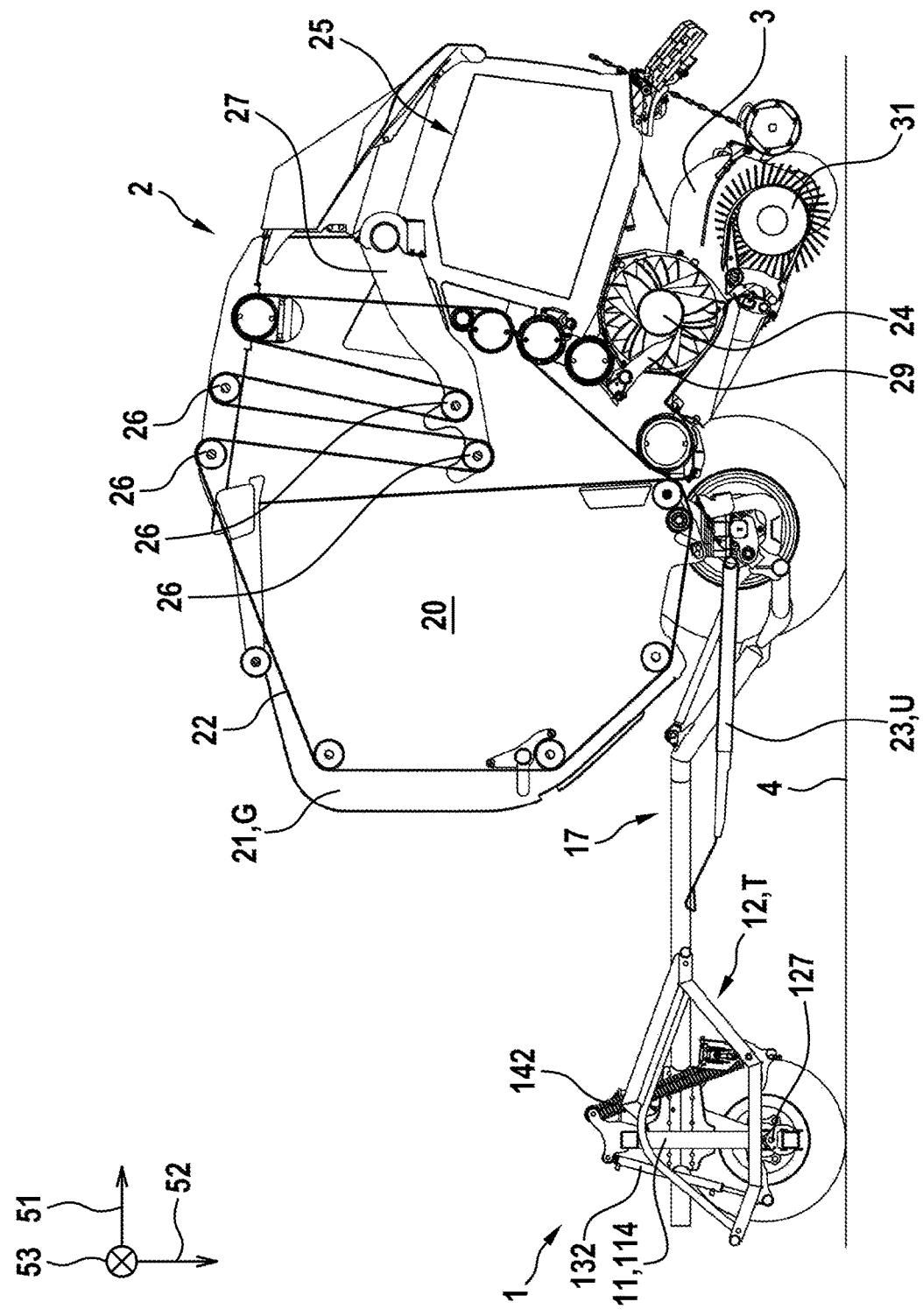
FIGS. 3 (a)-(f) shows in each case a side view of a round baler to which a bale accumulator is attached, or a cut-out thereof, wherein FIG. 3 (a)-(f) schematically represents a method for unloading a first and a second bale from a round baler of a work train onto the ground.
Figure 3B:
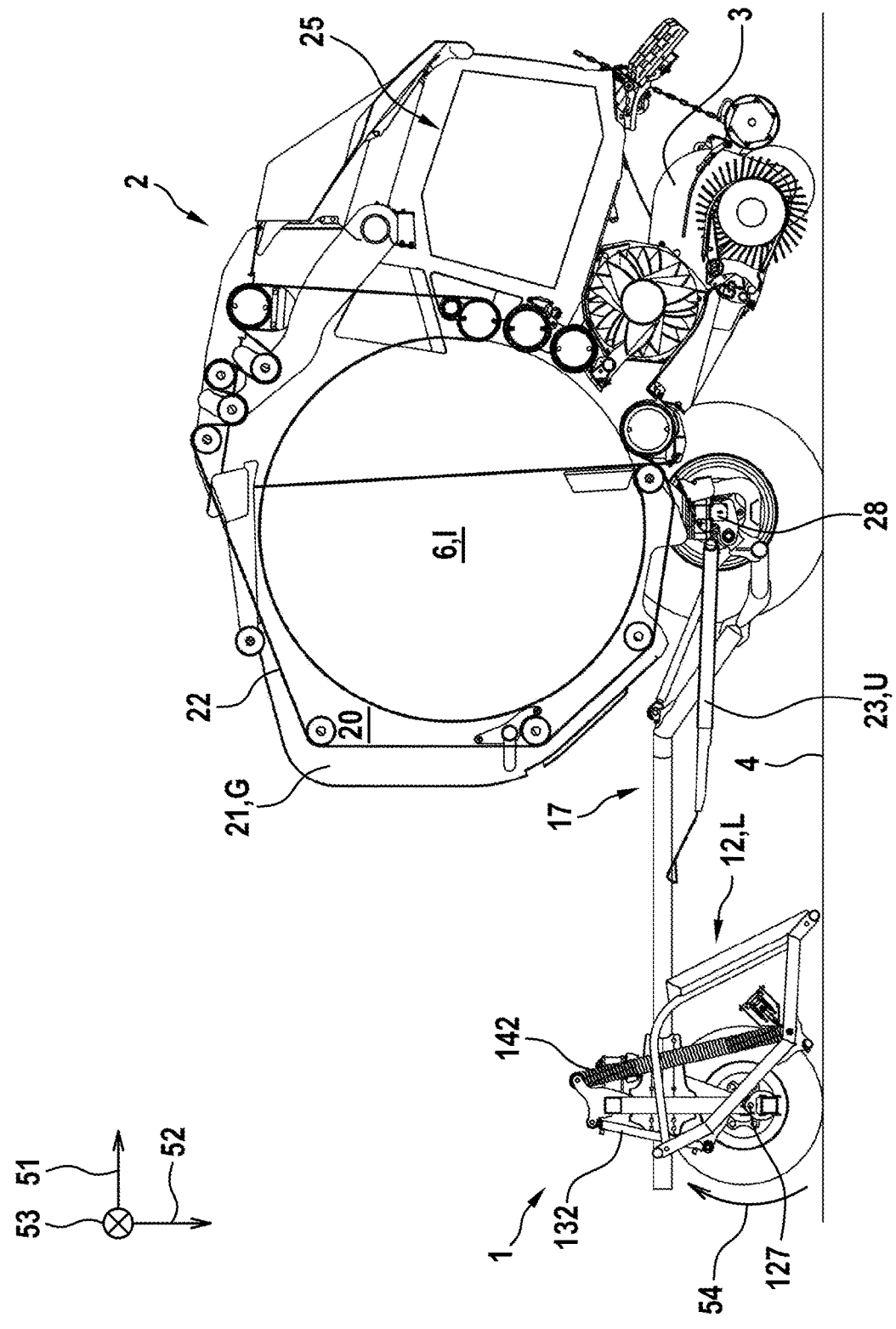
Figure 3C:
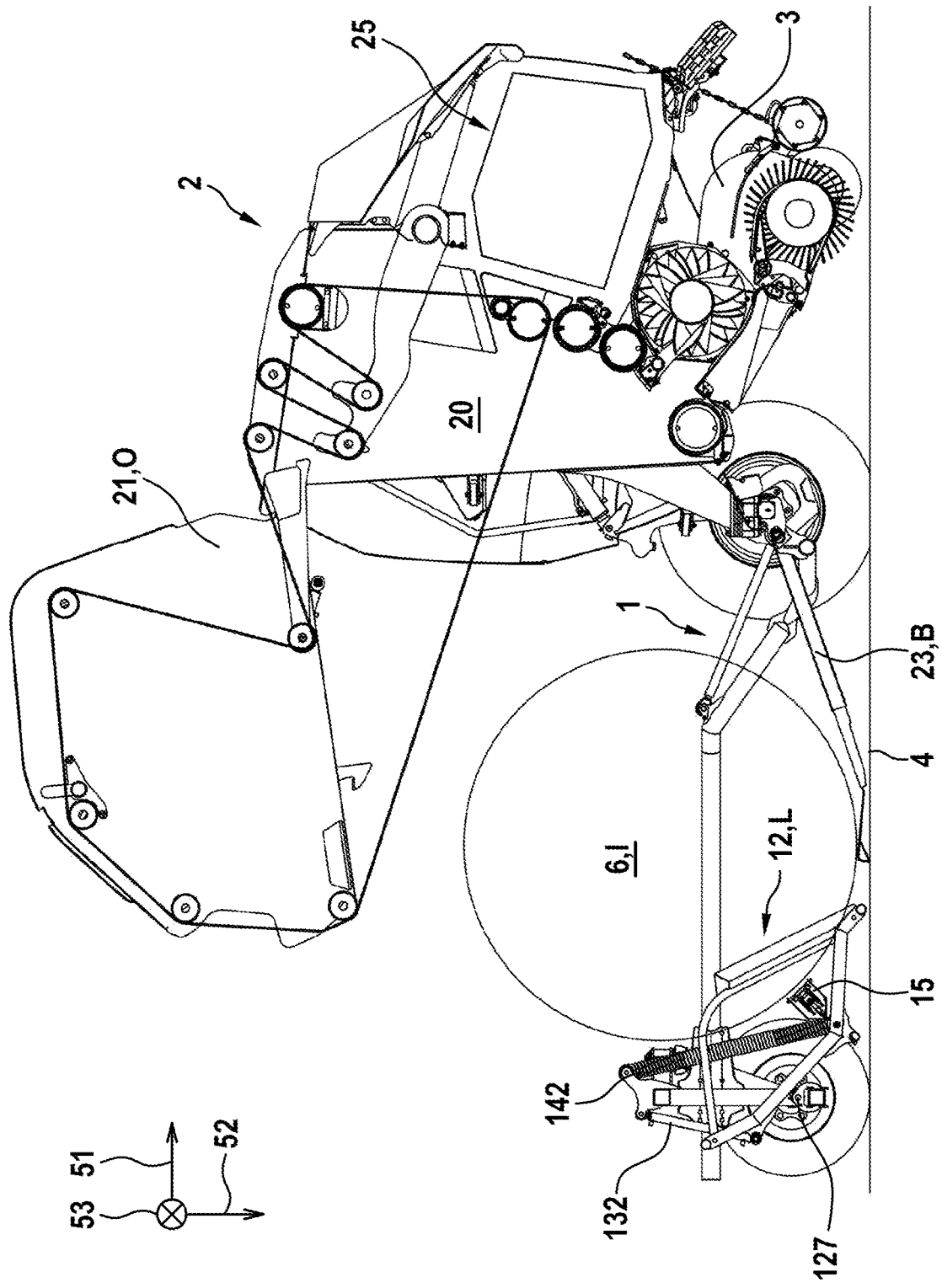
Figure 3D:
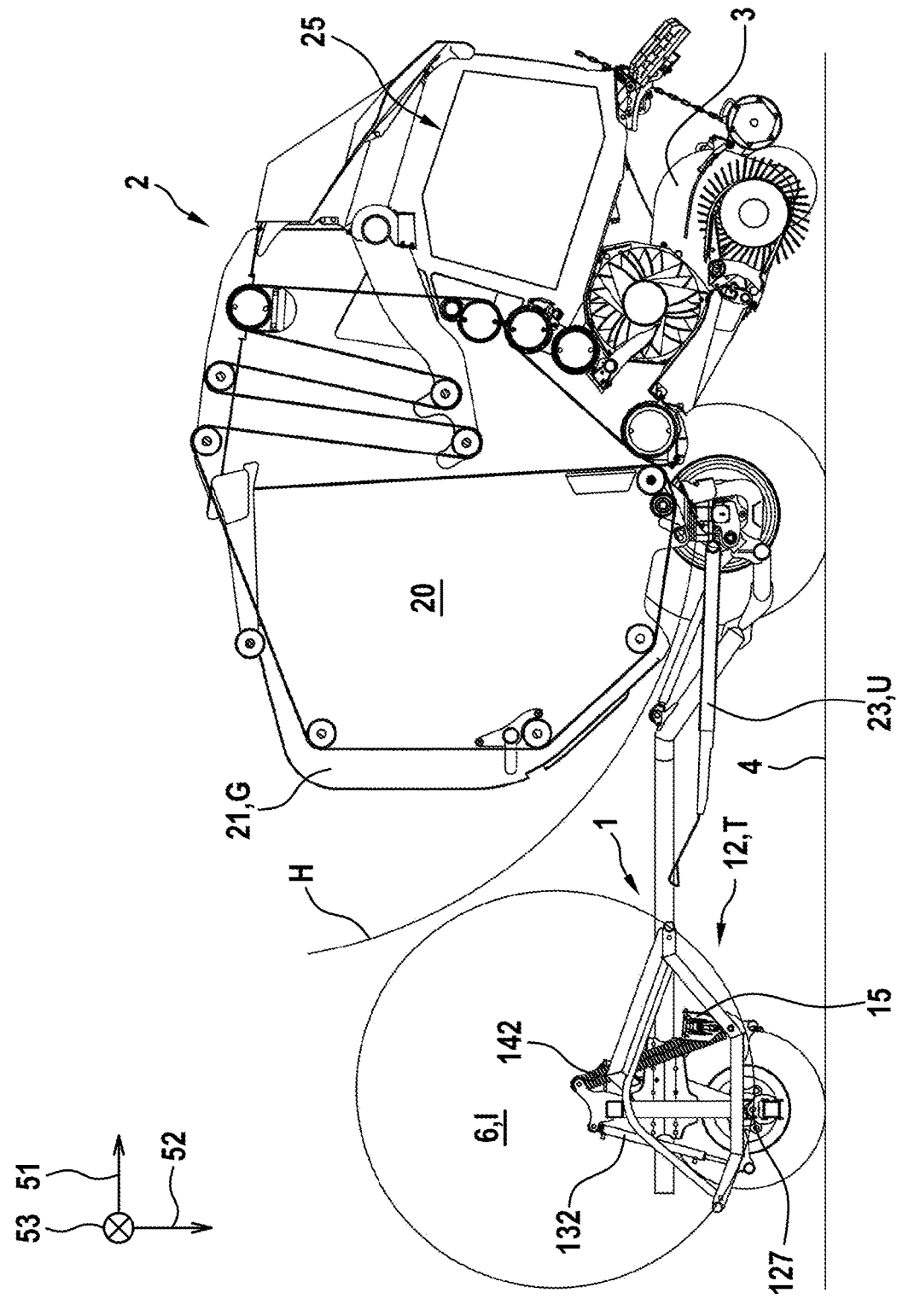
Figure 3E:
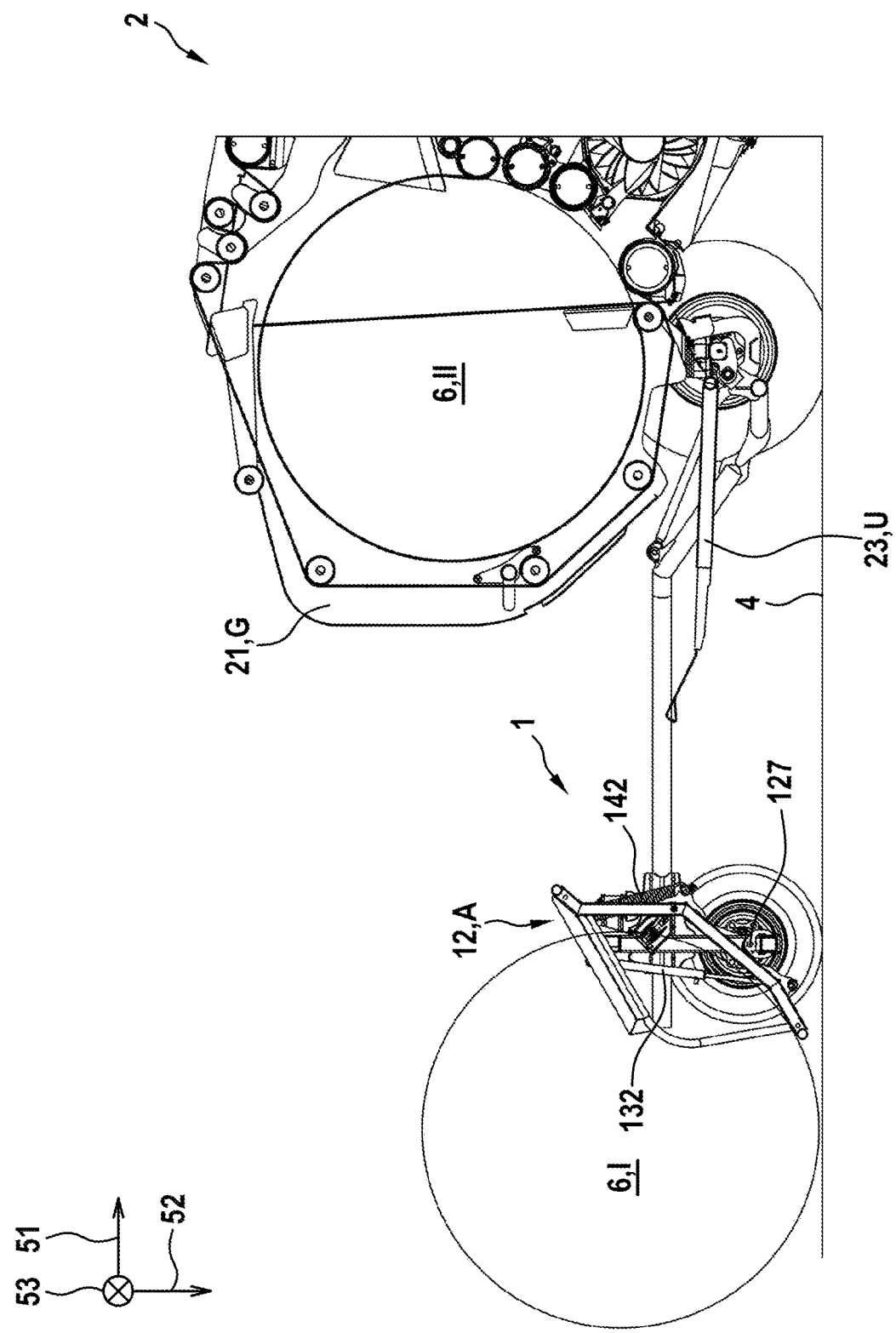
Figure 3F:
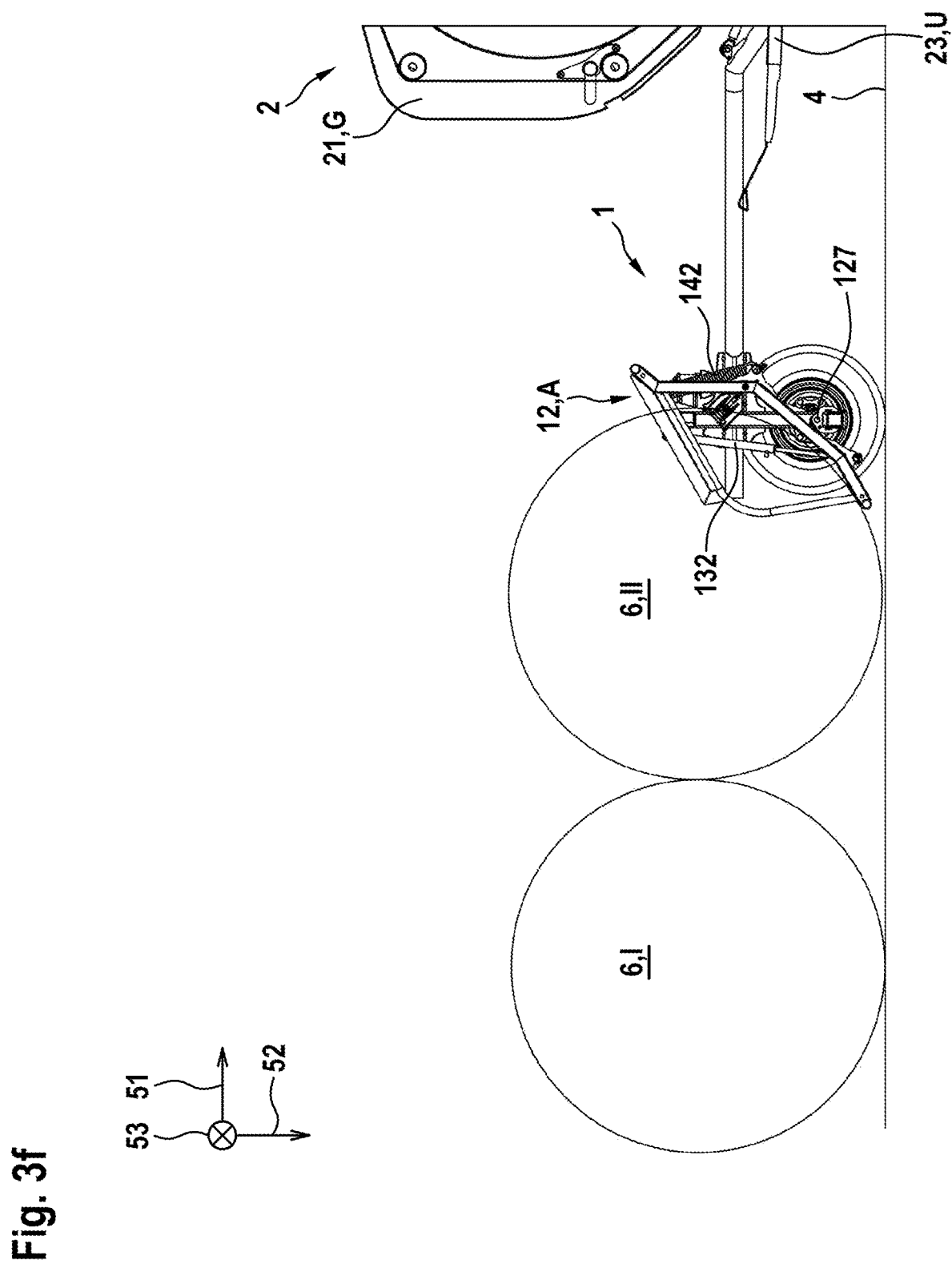

FIG. 2 shows a perspective view of the carrying device 12 of the bale accumulator 1 of FIG. 1. Retaining struts 121-126 can be seen. The two lower retaining struts 126, which extend in the direction of travel 51, connect the retaining struts 121-124, which extend transverse to the direction of travel 51. In each case one link 128 for the return means 141, 142 is arranged on an outer side (not designated) of the lower retaining struts 126. The links 129 for the actuators 131, 132 are provided in each case at ends of the third retaining strut 123.

The sensor 15, with which it is detected whether a bale 6 is arranged in the carrying device 12 or not, is formed as a proximity sensor here and has a metal plate (not designated), which is pivoted during pick-up of the bale. Alternatively, ultrasound sensors or light barriers can also be used, or other sensors which are used in engineering. The sensor 15 is arranged on the lower retaining strut 126 at the front in the direction of travel 51. As a result of the sensor 15, undefined operating states are avoided, which could occur if the bale 6, for example, after the expiry of a predefined ejection time, has not yet been completely ejected.

If the carrying device 12 furthermore has the two spaced apart rotary bearings 127 which are welded on below the lower retaining struts 126 as seen in the first spatial direction 52. The rotary bearings 127 are provided to bear the carrying device 12 on the frame 11 of the bale collector 1. A connection of the axes of the two rotary bearings 127 runs along a retaining axis 120 around which the carrying device 12 can be pivoted in and counter to the pivoting direction 54.

FIG. 3 shows in (*a*)-(*f*), in each case, a side view of a round baler 2 of a work train 9 (cf. FIG. 4), which comprises a tractor 7 (cf. FIG. 4) to which the round baler 2 is attached. The bale accumulator 1 of FIGS. 1 and 2 is attached to the round baler 2. The bale accumulator 1 can, however, also be attached to a self-driving baler (not shown). Here, FIGS. (*e*) and (*f*) only partially shows the round baler 2 or the bale accumulator 1.

FIGS. 3 (*a*)-(*f*) represent a method for unloading a first bale 6, I and a second bale 6, II from the round baler 2 onto the ground 4 in cut-out.

The round baler 2 comprises a pick-up 3 with a fork rotor 31 to pick up crops from the ground 4 as well as a handover rotor 24, which is provided to convey the crop into a baling chamber 20 of the round baler 2. The pick-up 3 is attached to the round baler 2 close to the ground at the front in order to pick up crops. The crop, for example, hay or straw, is supplied via the pick-up 3 to the fork rotor 31. The crop is conveyed from the fork rotor 31 to the baling chamber 20 of the round baler 2 via the handover rotor 24 downstream of the fork rotor 31. In this case, the crop is released by a stripper 29, which engages in the handover rotor 24, from said stripper 29 and is conveyed into the baling chamber 20 of the round baler 2.

The round baler 2 has a baling frame 28 on which a chassis (not designated) with wheels (not designated) is arranged. As seen in the first spatial direction 52, the baling chamber 20 is arranged above the chassis. At least one baling belt 22 for baling the crop into a bale 6 is arranged in the baling chamber 20, which baling belt 22 is guided over baling rollers 26 and which can be tensioned by a belt tensioner 27. The belt tensioner 27 tensions the baling belt 22 during the baling process of the bale 6 in order to bale the crop in a compressed form into a bale 6 with a high density and a high degree of strength. The invention is, however, not only restricted to round balers 2 with baling belts 22 for baling the crop, but rather also encompasses round balers (not shown), which use chains or other techniques for baling the crop.

In order to bind the bale 6 with a binding means (not shown) such as, for example, a net, the round baler 2 has a binding unit 25 arranged at the front of the round baler 2, i.e., at the front in the direction of travel 51.

The bale 6 can be ejected through a tailgate 21 which is opened after the binding of the bale 6. In order to accelerate the bale 6 during ejection, the round baler 2 comprises an accelerator 23 arranged pivotably on the baling frame 28 of the round baler 2. During ejection of the bale, the accelerator 23 is pushed out of the baling space 20 by the weight of the bale 6 onto the ground 4 so that it forms a ramp. As a result of this, the bale 6 rolls along the ramp 23 onto the ground 4 and is accelerated in the process. As a result of the acceleration, the bale rolls into the carrying device 12 of the bale accumulator 1. The sensor 15 detects if the bale 6 is arranged in the carrying device 12.

FIG. 3 (*a*) shows an empty round baler 2, the tailgate 21 of which is closed G. The bale accumulator 1 is attached to the round baler 2 at the rear in the direction of travel 51. The carrying device 12 of the bale accumulator 1 is in the transport position T. The accelerator is not under load U.

A baled first bale 6, I is arranged in the baling chamber 20 in FIG. 3 (*b*). The tailgate 21 is still closed G. The carrying device 12 of the bale accumulator 1 is pivoted into the load position L in contrast to the transport position T represented in FIG. 3 (*a*).

A control unit 82 (cf. FIG. 4) of the round baler 2 is configured to start a binding process when the bale 6, I has reached a predefined bale diameter. During the binding process, the bale 6, I is bound with the binding means, for example, composed of a net or composed of a film. The round baler 2 is stopped so that no crop is conveyed any more into the baling chamber 20. This can be performed by an operator of the round baler 2.

Alternatively, the stopping can also be performed automatically by virtue of the fact that the control unit 82 of the round baler 2 signals the start of the binding process to the tractor 7, and the tractor stops in response.

In order to pivot the carrying unit 12 of the bale accumulator 1 from the transport position T into the loading position L, a signal from the round baler 2 or the tractor 7 is used.

For example, the stopping of the work train 9, the start of the binding process, or the opening of the tailgate 21 can be used as a signal. During pivoting of the carrying device 12, the piston rods of the actuators 131, 132 are shortened, and the return means 141, 142 are tensioned further (see FIG. 1 (*b*)).

The opening of the tailgate 21 can be performed manually by the operator. Alternatively, or additionally, the control unit 82 of the round baler 2 can be configured to open the tailgate 21 and eject the first bale 6, I when it is bound.

FIG. 3 (*c*) shows the round baler 2 and the bale accumulator 1 in the case of an ejected first bale 6, I. The tailgate 21 of the round baler 2 is in the opened state O.

As a result of the loading by the first bale 6, I, the accelerator 23 is pushed by it onto the ground during ejection so that it forms a ramp, which accelerates the bale 6 during ejection. FIG. 3 (*c*) shows the accelerator 23, pivoted to the ground 4, in the loaded state B as well as the first bale 6, I while it rolls into the carrying device 12 located in the loading position L. During rolling of the bale 6, I into the carrying device 12, the return means 141, 142 pull it into the transport position T. The piston rods of the actuators 131, 132 expand in this case.

The control unit 82 of the round baler 2 is configured to close the tailgate 21 if the accelerator 23 is not under load U. The closing of the tailgate 21 can, however, also be performed via a time control unit.

FIG. 3 (*d*) shows the first bale in the carrying device 12, wherein the carrying device 12 is in the transport position. As a result of the position of the bale 6, I in the transport position T, collision of the tailgate 21 with the bale 6, I is prevented. This is represented schematically here by a line H, which shows the profile of the pivoting radius of an outer end of the tailgate 21 during opening and closing.

The first bale 6, I can now be transported with the work train 9 to another depositing location at which it is deposited together with the subsequent second bale 6, II. For this, the harvesting travel is continued, wherein the round baler 2 picks up crop and bales it to form the second bale 6, II. The second bale 6, II is bound if it has reached the predefined bale diameter. The control unit 82 of the round baler 2 is configured to indicate the start of the binding process. The signal is used to pivot the carrying unit 12 of the bale accumulator 1 from the transport position T into the unloading position A. During pivoting of the carrying device 12 from the transport position T into the unloading position A, the piston rods of the actuators 131, 132 are extended by a further relaxation of the return means 141, 142.

In FIG. 3 (*e*), the second bale 6, II is arranged in the baling space 20. The carrying device 12 is pivoted into the unloading position A in contrast to the transport position T represented in FIG. 3 (*d*). FIG. 3 (*e*), therefore, shows the bale accumulator 1 during ejection of the first bale 6, I. Here, the first bale 6, I rolls out of the carrying device 12. This is detected by means of the sensor 15. The second bale 6, II is already bound in this case.

After ejecting the first bale 6, I, the carrying device 12 is pivoted from the unloading position A into the loading position L. The piston rods of the actuators 131, 132 are shortened in this case, as a result of which the return means 141, 142 are tensioned, and the carrying device 12 is pivoted from the unloading position A into the loading position L.

The second bale 6, II can roll into the carrying device 12 as described in FIG. 3 (*b*). The work train 9 is then in the state represented in FIG. 3 (*b*).

The second bale 6, II can subsequently be ejected from the round baler 2 in an analogous manner to the method steps described in FIGS. 3 (*c*)-(*e*), picked up into the carrying device 12 and subsequently ejected from it.

FIG. 3 (*f*) shows the bale accumulator 1 during ejection of the second bale 6, II.

The second bale 6, II tends to roll into approximately the same depositing position as the first bale 6, I. It, therefore, rolls against the first bale 6, I.

During pivoting back of the carrying device 12 from the unloading position A into the transport position T, the second bale 6, II is pushed by the carrying device 12 against the first bale 6, I. The bales 6, I, 6, II hook in one another. As a result of this, they bear directly against one another.

The bales can be picked up later with a commercially available pick-up fork (not shown) by a tractor and be placed on a transport vehicle (not shown).

As a result of the use of the bale accumulator 1, two bales 6, I, II are at all times deposited directly next to one another. As a result, the bales 6, I, II are only deposited at half the number of depositing locations. The bales 6 can therefore, be gathered in correspondingly faster. The distance traveled during gathering in is furthermore significantly reduced as a result of this; hence, fuel consumption for the harvesting process is reduced overall.

The method can be performed very quickly by further sensors (not shown) on the bale accumulator 1 so that the working process ultimately only has to be interrupted for a very short period of time despite the standstill of the round baler 2.

FIG. 4 schematically shows a work train 9 comprising a tractor 9, a round baler 2, and a bale accumulator 1.

The round baler 2 is attached to the tractor 7 at the rear. It is linked via power couplings (not shown), such as, for example, a PTO shaft and/or hydraulic couplings, to the tractor 7 in a power-receiving manner. A self-driving round baler can also be used instead of the combination of tractor 7 and round baler 2.

The bale accumulator 1 is articulated to the round baler 2 via the tow bar 17 (see FIG. 1 (*d*)) and connected to the round baler 2 and/or the tractor 7 in a power-receiving manner via power couplings (not shown).

The bale accumulator 1 has at least one sensor 15 with which the bale 15 arranged in the carrying device 12 is detected. Further sensors (not represented) can furthermore be provided which detect, for example, the positions L, T, A of the carrying device 12. As a result of this, the loading and ejection of a bale 6 can be performed quicker.

In principle, the control of the carrying device 12 of the bale accumulator 1 can be performed by a control device (not shown) of the tractor 7. The control of the carrying device 12 of the bale accumulator 1 is performed, here, however, by a control unit 82 of the round baler 2. A signal to start the binding process or to open the tailgate 21 can be used to pivot the carrying device 12 to pick up the first bale 6, I into the loading position L.

The signal to start the binding process is used to eject the first bale 6, I. The time in which the second bale 6, II is bound is sufficient to eject the first bale 6, I and to pivot the carrying device 12 from the unloading position A into the loading position L. The second bale 6, II can then be ejected by pivoting the carrying device 12 from the loading position L into the unloading position A.

No further signal is required by the round baler 2 in this case. The round baler 2 can, therefore, operate as if the bale accumulator 1 were not attached.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

List of Reference Characters

| | |
|---|---|
| 1 | Bale accumulator |
| 2 | Round baler |
| 3 | Pick-up |
| 4 | Ground |
| 6 | Bale |
| 6, I | First bale |
| 6, II | Second bale |
| 7 | Tractor |
| 9 | Work train |
| 11 | Frame |
| 12 | Carrying device |
| 15 | Sensor |
| 16 | Wheels |
| 17 | Tow bar |
| 20 | Baling chamber or space |
| 21 | Tailgate |
| 22 | Baling belt |
| 23 | Accelerator |
| 24 | Handover rotary |
| 25 | Binding unit |
| 26 | Baling rotors |
| 27 | Belt tensioner |
| 28 | Baling frame |
| 29 | Stripper |
| 31 | Fork rotor |
| 51 | Direction of travel |
| 52 | First spatial direction |
| 53 | Second spatial direction |
| 54 | Pivoting direction |
| 82 | Control unit |
| 111 | Retaining arm(s) |
| 112 | Wheel bearings |
| 113 | Cross beam |
| 114 | External outer beam(s) |
| 120 | Notional retaining axis |
| 121 | First retaining strut |
| 122 | Second retaining strut |
| 123 | Third retaining strut |
| 124 | Fourth retaining strut |
| 125 | Fifth retaining strut (lower lateral retaining strut) |
| 126 | Sixth retaining strut (lower retaining strut) |
| 127 | Rotary bearing(s) |
| 128 | First link |
| 129 | Second link |
| 131 | First actuator |
| 132 | Second actuator |
| 134 | UNKNOWN |
| 141 | First return means |
| 142 | Second return means |
| 160 | Chassis axes |
| 161 | First individual wheel suspension |
| 162 | Second individual wheel suspension |
| 163 | Continuous or notional wheel axis |
| 171 | Two external drawbars |
| 172 | Cross bar |
| 180 | Ball joint |
| 181 | First tension and/or compression strut |
| 182 | Second tension and/or compression strut |
| A | Unloading position |

TABLE 1-continued

List of Reference Characters

| | |
|---|---|
| B | Loaded state |
| G | Closed |
| H | Line which shows the profile of the pivoting radius of an outer end of the tailgate 21 during opening and closing |
| L | Loading position |
| O | Open state |
| T | Transport position |
| U | Load |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:
1. A bale accumulator (1) attaching to a round baler (2) and for transporting a bale (6) comprising of:
a carrying device (12) for carrying the bale (6), the carrying device (12) comprising retaining struts (121, 122, 123, 124, 125, 126) which have in particular hollow profiles;
wherein the carrying device (12) is adjustable into;
a loading position (L) to pick up the bale (6), wherein in the loading position (L) a first strut (121) is rotated to a location below a wheel axis (163) of the carrying device (12) at or near the ground,
a transport position (T) to transport the bale (6), wherein in the transport position (T) the first strut (121) is rotated away from the ground, and
an unloading position (A) to discharge the bale (6) onto the ground (4), wherein in the unloading position (A) the first strut (121) is rotated further away from the ground;
wherein the bale accumulator (1) has two wheels (16), wherein the carrying device (12) is mounted, as seen in a first spatial direction (52), at the height of or below the wheel axis (163) of a wheel (16) of the bale accumulator (1) and/or that the carrying device (12) is arranged between the two wheels (16) of the bale accumulator (1).

2. The bale accumulator (1) attaching to a round baler (2) and for transporting a bale (6) according to claim 1, wherein the carrying device (12) comprises lateral retaining struts (125, 126) for guiding the bale (6).

3. The bale accumulator (1) attaching to a round baler (2) and for transporting a bale (6) according to claim 1, wherein the wheels (16) are suspended individually on a frame (11) of the bale accumulator (1).

4. The bale accumulator (1) attaching to a round baler (2) and for transporting a bale (6) according to claim 3, wherein the frame (11) is formed to be substantially U-shaped and for each of the wheels (16) comprises in each case a projecting retaining arm (111) on which the wheel (16) assigned to it is suspended.

5. The bale accumulator (1) attaching to a round baler (2) and for transporting a bale (6) according to claim 4, wherein a wheel bearing (112) is arranged at an open end of the projecting retaining arm (111), in which wheel bearing (112) the wheel suspension (161) is suspended, in particular rotatably about a chassis axis (160).

6. The bale accumulator (1) attaching to a round baler (2) and for transporting a bale (6) according to claim 2, wherein the carrying device (12) is rotatably or pivotably mounted on at least one rotary bearing (127), in particular a rubber bearing, a ball joint bearing or rolling bearing, about a retaining axis (120) in and counter to a pivoting direction (54).

7. The bale accumulator (1) attaching to a round baler (2) and for transporting a bale (6) according to claim 1, wherein pivoting of the carrying device (12) includes at least one actuator (131, 132), in particular a hydraulic, pneumatic, electric, or electrohydraulic actuator (131, 132).

8. The bale accumulator (1) attaching to a round baler (2) and for transporting a bale (6) according to claim 7, wherein the actuator (131, 132) is a single-acting hydraulic cylinder (131, 132) which is provided to adjust the carrying device (12) from the unloading position (A) into the transport position (T) and/or from the transport position (T) into the loading position (L), and the bale accumulator (1) has a return means (141, 142), in particular a spring (141, 141), for returning the carrying device (12).

9. The bale accumulator (1) attaching to a round baler (2) and for transporting a bale (6) according to claim 1, wherein the carrying device (12) comprises a sensor (15) which is configured to detect whether the bale (6) is arranged in the carrying device (12).

10. The bale accumulator (1) attaching to a round baler (2) and for transporting a bale (6) according to claim 1, wherein the bale accumulator (1) has a tow bar (17) which comprises external drawbars (171) which are arranged so that they laterally guide the bale (6) during loading into the carrying device (12).

11. The bale accumulator (1) attaching to a round baler (2) and for transporting a bale (6) according to claim 10, wherein the tow bar (17) has a central ball joint (180) and/or at least one, in particular two, lateral tension and/or compression struts (181, 182) for articulation of the bale accumulator (1) on a round baler (2).

12. A work train comprising of:
a round baler (2) comprising a accelerator (23), said accelerator (23) pivotable about an axis at a first end to allow the accelerator (23) to rotate downward upon weight of a bale (6); and
a bale accumulator (1) that includes a carrying device (12) for carrying the bale (6), the carrying device (12) comprising retaining struts (121, 122, 123, 124, 125, 126) which have in particular hollow profiles;
wherein the carrying device (12) is adjustable into:
a loading position (L) to pick up the bale (6), wherein in the loading position (L) a first strut (121) is rotated to a location at or near the ground adjacent a second end of the accelerator (28),
a transport position (T) to transport the bale (6), wherein in the transport position (T) the first strut (121) is rotated away from the ground, and
an unloading position (A) to discharge the bale (6) onto the ground (4), wherein in the unloading position (A) the first strut (121) is rotated further away from the ground;
wherein the bale accumulator (1) has two wheels (16), wherein the carrying device (12) is mounted, as seen in a first spatial direction (52), at the height of or below a wheel axis (163) of a wheel (16) of the bale accumulator (1) and/or that the carrying device (12) is arranged between the two wheels (16) of the bale accumulator (1).

13. A method of unloading a first and a second bale (6, I; 6, II) from a round baler (2) of a work train having a bale accumulator (1) onto the ground (4) comprising:
baling bales (6, I; 6, II) with a baling chamber (20) of the round baler (2), wherein the bale accumulator (1) is attached to the round baler (2);
transferring the bales (6, 1; 6; II) via a rotatable accelerator (28) from the baling chamber (20) to a carrying device (12) connected to the round baler (2), said rotatable accelerator (28) pivotable about an axis at a first end to allow the accelerator (23) to rotate downward upon weight of a bale;
carrying the first bale (6, I) during the formation of the second bale (6, II) with the carrying device (12);
depositing the bales (6, 1; 6, II) at a same unloading position by the round baler (2); and
pushing the second bale (6, II) against the first bale (6, I) during unloading.

14. The method of unloading a first and a second bale (6, I; 6, II) from a round baler (2) of a work train having a bale accumulator (1) onto the ground (4) according to claim 13, wherein the carrying device (12) is pivotable starting from a transport position (T) by pivoting in a pivoting direction (54) reversibly into a loading position, and starting from the transport position (T) by pivoting counter to the pivoting direction (54) reversibly into an unloading position (A), wherein the method further comprises the consecutive steps:

carrying the first bale (6, I) in the carrying device (12), wherein the carrying device (12) is in the transport position (T), while the round baler (2) forms a subsequent second bale (6, II);

starting a binding of the second bale (6, II);

depositing the first bale (6, II) on the ground (4) by pivoting the carrying device (12) from the transport position (T) into the unloading position (A);

pivoting the carrying device (12) from the unloading position (A) into the loading position (L);

ejecting the second bale (6, II) from the round baler (2);

picking up the second bale (6, II) into the carrying device (12);

depositing the second bale (6, II) on the ground (4) by pivoting the carrying device (12) from the loading position (L) into the unloading position (A); and pivoting the carrying device (12) from the unloading position (A) into the transport position (T), wherein the second bale (6, II) is pushed against the first bale (6, I) during pivoting of the carrying device (12) from the unloading position (A) into the transport position (T).

15. The method of unloading a first and a second bale (6, I; 6, II) from a round baler (2) of a work train having a bale accumulator (1) onto the ground (4) according to claim 13, further comprising:

stopping the round baler (2) during the binding of the second bale (6, II) until the second bale (6, II) is deposited; and pivoting the carrying device (12) back into the transport position (T).

* * * * *